United States Patent
Bison et al.

(10) Patent No.: US 9,758,921 B2
(45) Date of Patent: Sep. 12, 2017

(54) METHOD FOR CONTROLLING A LAUNDRY DRYER INCLUDING A FAN MOTOR FOR DRIVING A DRYING AIR STREAM FAN WITH A VARIABLE SPEED

(71) Applicant: Electrolux Home Products Corporation N.V., Brussels (BE)

(72) Inventors: Alberto Bison, Pordenone (IT); Francesco Cavarretta, Pordenone (IT); Maurizio Ugel, Fiume Veneto (IT); Massimiliano Vignocchi, Pordenone (IT)

(73) Assignee: Electrolux Home Products Corporation N.V., Brussels (BE)

( * ) Notice: Subject to any disclaimer, the term of this patent is extended or adjusted under 35 U.S.C. 154(b) by 37 days.

(21) Appl. No.: 14/647,243

(22) PCT Filed: Nov. 18, 2013

(86) PCT No.: PCT/EP2013/074042
§ 371 (c)(1),
(2) Date: May 26, 2015

(87) PCT Pub. No.: WO2014/079800
PCT Pub. Date: May 30, 2014

(65) Prior Publication Data
US 2015/0322619 A1    Nov. 12, 2015

(30) Foreign Application Priority Data
Nov. 26, 2012    (EP) ..................... 12194170

(51) Int. Cl.
*D06F 58/28* (2006.01)
*D06F 58/20* (2006.01)

(52) U.S. Cl.
CPC ............ *D06F 58/28* (2013.01); *D06F 58/206* (2013.01); *D06F 58/20* (2013.01);
(Continued)

(58) Field of Classification Search
CPC .......... F26B 19/00; F26B 21/00; F26B 21/06; D06F 58/00; D06F 58/12
(Continued)

(56) References Cited

U.S. PATENT DOCUMENTS

| 4,665,628 A * | 5/1987 | Clawson ................. D06F 58/02 34/131 |
| 4,689,533 A * | 8/1987 | Yang ......................... H02P 7/05 318/256 |

(Continued)

FOREIGN PATENT DOCUMENTS

| BE | EP 2735642 A1 * | 5/2014 | ............ D06F 58/28 |
| BE | WO 2014079934 A1 * | 5/2014 | ............ D06F 58/28 |

(Continued)

OTHER PUBLICATIONS

International Search Report mailed Apr. 30, 2014 in corresponding International Application No. PCT/EP2013/074042.
(Continued)

*Primary Examiner* — Stephen M Gravini
(74) *Attorney, Agent, or Firm* — Banner & Witcoff, Ltd.

(57) ABSTRACT

A method is provided for controlling a laundry dryer including a fan motor (26) for driving a drying air stream fan (18) with a variable speed (vf) and a drum motor (28) for driving a laundry drum (12). The method comprises the steps of setting a predetermined course for the speed (vd) of the drum motor (28), maintaining the speed (vd) of the drum motor (28) according to the predetermined course for the speed (vd) of said drum motor (28), detecting a power (Pd) or a current absorbed by the drum motor (28), and controlling the
(Continued)

speed (vf) of the fan motor (26) on the basis of the absorbed power (Pd) or current of the drum motor (28). The speed (vf) of the fan motor (26) increases with a decreasing absorbed power (Pd) or current of the drum motor (28) and/or the speed (vf) of the fan motor (26) decreases with an increasing absorbed power (Pd) or current of the drum motor (28).

13 Claims, 8 Drawing Sheets

(52) U.S. Cl.
    CPC ............ *D06F 2058/287* (2013.01); *D06F 2058/2864* (2013.01); *D06F 2058/2877* (2013.01); *Y02B 40/72* (2013.01)

(58) Field of Classification Search
    USPC ....... 34/86, 595, 606, 610; 68/19, 20; 8/149, 8/159
    See application file for complete search history.

(56) References Cited

U.S. PATENT DOCUMENTS

| | | | |
|---|---|---|---|
| 6,745,495 B1 | 6/2004 | Riddle et al. | |
| 6,954,995 B2* | 10/2005 | Kitamura | D06F 25/00 34/597 |
| 7,367,137 B2* | 5/2008 | Jonsson | D06F 58/10 34/265 |
| 7,525,262 B2* | 4/2009 | Carow | D06F 58/28 318/254.1 |
| 7,526,879 B2* | 5/2009 | Bae | D06F 58/206 34/239 |
| 7,716,850 B2* | 5/2010 | Deem | D21F 5/181 162/359.1 |
| 7,921,578 B2* | 4/2011 | McAllister | D06F 35/00 134/10 |
| 8,028,439 B2* | 10/2011 | Prajescu | D06F 58/06 165/89 |
| 8,112,904 B2* | 2/2012 | Kono | D06F 25/00 34/201 |
| 9,228,292 B2* | 1/2016 | Wehrheim | D06F 58/04 |
| 9,335,095 B2* | 5/2016 | Bison | D06F 39/12 |
| 9,356,542 B2* | 5/2016 | Ragogna | D06F 58/206 |
| 9,359,713 B2* | 6/2016 | Kang | D06F 25/00 |
| 2007/0251119 A1* | 11/2007 | Kim | D06F 58/28 34/546 |
| 2012/0174430 A1 | 7/2012 | Kim et al. | |
| 2012/0186305 A1 | 7/2012 | Taniguchi et al. | |
| 2015/0308034 A1* | 10/2015 | Cavarretta | D06F 58/28 62/79 |
| 2015/0322619 A1* | 11/2015 | Bison | D06F 58/28 34/487 |
| 2016/0138208 A1* | 5/2016 | Bison | D06F 58/206 34/77 |

FOREIGN PATENT DOCUMENTS

| | | | | |
|---|---|---|---|---|
| DE | 102011005164 A1 | | 9/2012 | |
| EP | 1688532 A2 | | 8/2006 | |
| EP | 1688532 A3 | * | 9/2006 | ............ D06F 58/28 |
| EP | 2221412 A1 | | 8/2010 | |
| EP | 2281935 A1 | | 2/2011 | |
| KR | WO 03035962 A1 | * | 5/2003 | ............ D06F 58/26 |
| KR | EP 1686211 A3 | * | 12/2007 | ............ D06F 58/26 |

OTHER PUBLICATIONS

International Search Report mailed Apr. 8, 2014 in related International Application No. PCT/EP2013/074392.

* cited by examiner

METHOD FOR CONTROLLING A LAUNDRY DRYER INCLUDING A FAN MOTOR FOR DRIVING A DRYING AIR STREAM FAN WITH A VARIABLE SPEED

BACKGROUND

The present invention relates to a method for controlling a laundry dryer including a fan motor for driving a drying air stream fan with a variable speed. Further, the present invention relates to a laundry dryer including an air stream circuit with a drying air stream fan and a laundry drum.

The rotation speeds of the laundry drum and the drying air stream fan are typically adapted to a maximum amount of load inside the laundry drum. In practice, the real amount of load in the laundry drum is lower than the maximum amount of load in the most cases. The drying cycle is negatively affected, when the laundry drum contains a smaller amount of laundry. Therefore, it would be advantageous to adapt the drying cycle to the real amount of the laundry inside the laundry drum.

SUMMARY OF SELECTED INVENTIVE ASPECTS

It is an object of the present invention to provide a method for controlling a laundry dryer and a corresponding laundry dryer, wherein the drying cycle is adapted to the real amount of load inside the laundry drum.

According to an aspect of the present invention, a method is provided for controlling a laundry dryer including a fan motor for driving a drying air stream fan with a variable speed and a drum motor for driving a laundry drum, said method comprising the steps of:

setting a predetermined course for the speed of the drum motor, maintaining the speed of the drum motor according to the predetermined course for the speed of said drum motor, detecting a power or a current absorbed by the drum motor, and controlling the speed of the fan motor on the basis of the absorbed power or current of the drum motor, wherein the speed of the fan motor increases with a decreasing absorbed power or current of the drum motor and/or the speed of the fan motor decreases with an increasing absorbed power or current of the drum motor.

A main idea of the present invention is the adaption of the speed of the fan motor to the amount of load inside the laundry drum, since the absorbed power of the drum motor corresponds, substantially, with the amount of load. In the case of a partial load in the laundry drum, the speed of the fan motor is higher than in the case of the maximum amount of load. The flow rate of an air stream for the partial load is higher than the flow rate of the drying air stream for the maximum amount of load. The higher rotation speed of the drying air stream fan reduces the drying time. If the laundry dryer is a heat pump dryer, then the higher rotation speed of the drying air stream fan improves, additionally, the performances.

Preferably, the steps of setting the predetermined course for the speed of the drum motor and of maintaining the speed of the drum motor according to the predetermined course for the speed of said drum motor comprise a controlling of an inverter motor according to a predetermined speed profile.

Preferably, the speed of the fan motor may start with a predetermined speed value, wherein after starting the fan motor with said predetermined speed value, the speed of the fan motor is modified on the basis of the absorbed power or current of the drum motor.

Preferably, the drum motor is an asynchronous motor. Preferably, said asynchronous motor is controlled at a predetermined constant fixed speed.

Preferably, the fan motor is an inverter motor.

The object of the present invention is further achieved by the method according to claim 5.

According to another aspect of the present invention, a method is provided for controlling a laundry dryer including a fan motor for driving a drying air stream fan with a variable speed and a drum motor for driving a laundry drum, said method comprising the steps of:

setting a predetermined course for the power of the drum motor, maintaining the power of the drum motor according to the predetermined course for the power of said drum motor, detecting a speed of the drum motor, and controlling the speed of the fan motor on the basis of the speed of the drum motor, wherein the speed of the fan motor increases with an increasing speed of the drum motor, and/or the speed of the fan motor decreases with a decreasing speed of the drum motor.

According to this alternative method the predetermined course for the power of the drum motor is set instead of the course for the speed. The speed of the drum motor is detected instead of the power or current absorbed by the drum motor. The speed of the fan motor depends on the speed of the drum motor instead of the absorbed power or current of said drum motor.

In particular, the steps of setting the predetermined course for the power of the drum motor and of maintaining the power of the drum motor according to the predetermined course for the power of said drum motor comprise a controlling of an inverter motor according to a predetermined power profile.

Further, the speed of the fan motor may start with a predetermined speed value, wherein after starting the fan motor with said predetermined speed value, the speed of the fan motor is modified on the basis of the speed of the drum motor.

Preferably, the drum motor is an asynchronous motor. Preferably, said asynchronous motor is controlled at a predetermined constant fixed speed.

Preferably, the fan motor is an inverter motor.

For example, the step of controlling the speed of the fan motor on the basis of the speed, the absorbed power or current of the drum motor occurs after a drying cycle starting phase including the step of detecting the speed of the drum motor or the step of detecting the power or current absorbed by the drum motor, respectively.

Preferably, the course for the speed of the drum motor is a periodic function, wherein said periodic function oscillates around an average value of the speed.

Further, the speed of the fan motor may increase linearly with the decreasing absorbed power or current of the drum motor or with the increasing speed of the drum motor, respectively, and/or the speed of the fan motor decreases linearly with the increasing absorbed power or current of the drum motor or with the decreasing speed of the drum motor, respectively.

For safety reasons, a maximum level for the speed of the fan motor maybe defined.

The maximum level for the speed of the fan motor may depend on the noise generated by the air steam fan.

Further, the maximum level for the speed of the fan motor may depend on the power absorbed by the fan motor and/or on the flow rate generated by the fan motor.

In particular, the method is provided for a laundry dryer with a heat pump system.

Preferably, the rotation speed or power of a compressor of said heat pump system is controlled in dependence of the speed of the fan motor.

Preferably, the rotation speed or power of the compressor increases with an increasing speed of the fan motor.

According to yet another aspect of the present invention, a laundry dryer includes a drying air stream circuit with a laundry drum and a drying air stream fan, wherein:

the laundry dryer comprises a drum motor for driving the laundry drum, the laundry dryer comprises a fan motor for driving the drying air stream fan, the laundry dryer comprises a control unit for controlling the speed of the fan motor and the speed of the drum motor, the control unit is provided for setting a predetermined course for the speed or the power of the drum motor, the control unit is provided for maintaining the speed or power, respectively, of the drum motor according to the predetermined course, the control unit is provided for detecting the power or current absorbed by the drum motor or the speed of said drum motor, the control unit is provided for controlling the speed of the fan motor on the basis of the power or current absorbed by the drum motor or the speed of said drum motor, so that the speed of the fan motor increases with a decreasing power or current absorbed by the drum motor or with an increasing speed of said drum motor, respectively, and/or the speed of the fan motor decreases with an increasing power or current absorbed by the drum motor or with a decreasing speed of said drum motor, respectively.

Preferably, the fan motor is an inverter motor.

Preferably, the drum motor is an inverter motor.

In particular, the laundry dryer comprises a heat pump system, and preferably, a variable rotation speed and/or a variable power of a compressor of the heat pump system are controlled or controllable by the control unit.

Preferably, the control unit drives the rotation speed or power of the compressor to increase with an increasing speed of the fan motor.

Alternatively, the laundry dryer comprises an air-to-air condenser providing a heat exchange between the drying air stream circuit and ambient air.

Preferably, the laundry dryer is provided for the method mentioned above.

BRIEF DESCRIPTION OF THE DRAWINGS

The invention will be described in further detail with reference to the drawings, in which.

DETAILED DESCRIPTION OF EXAMPLE EMBODIMENTS

Figure 1:
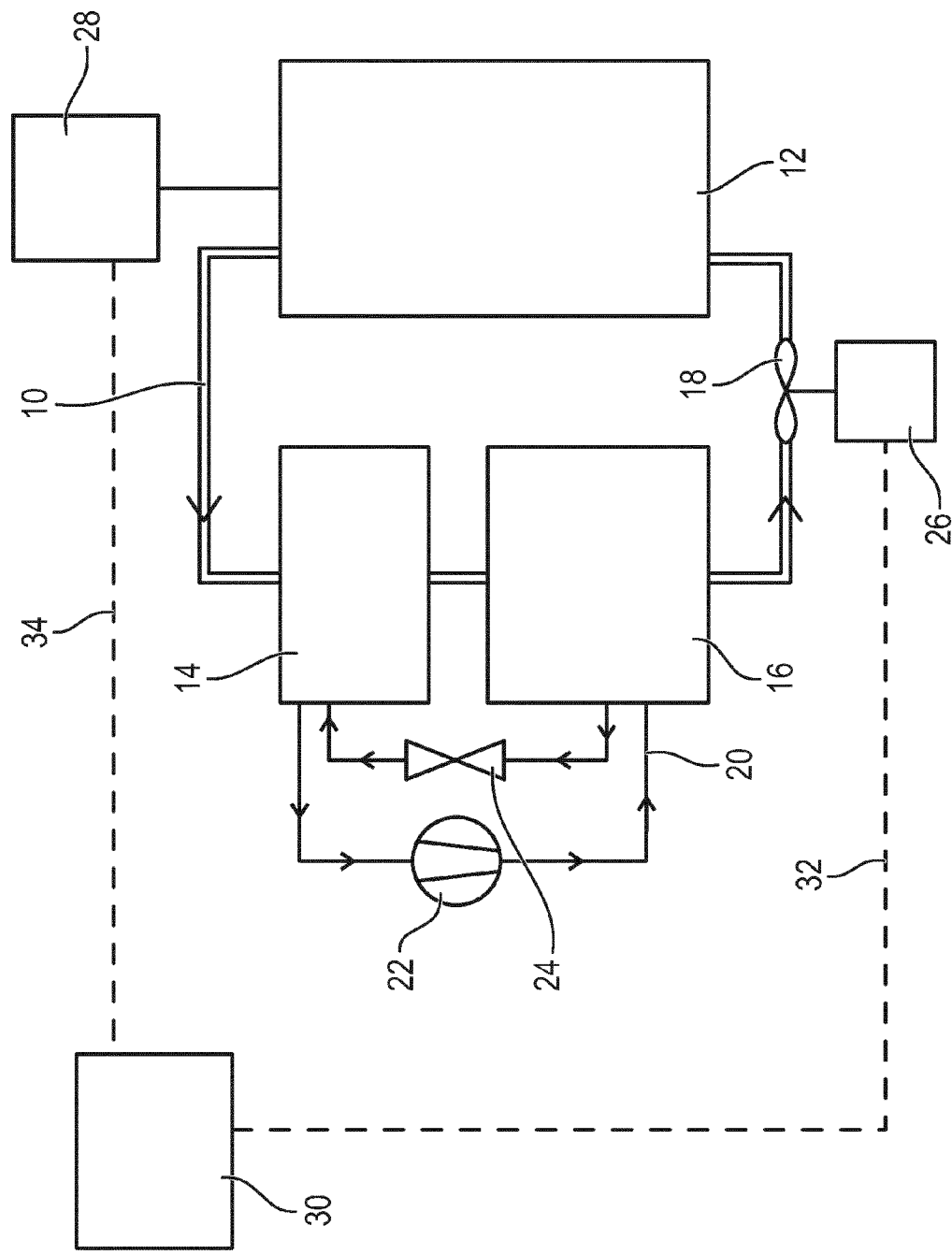
FIG. 1 illustrates a schematic diagram of a laundry dryer with a heat pump system according to a first embodiment of the present invention.

FIG. 1 illustrates a schematic diagram of a laundry dryer with a heat pump system according to a first embodiment of the present invention.

The heat pump system comprises an air stream circuit 10, preferably closed, and a closed refrigerant circuit 20. The drying air stream circuit 10 is formed by a laundry treatment chamber 12, preferably a rotatable drum, an evaporator 14, a condenser 16 and an air stream fan 18. The refrigerant circuit 20 is formed by a compressor 22, the condenser 16, an expansion device 24 and the evaporator 14. For example, the expansion device 24 is an expansion valve. The evaporator 14 and the condenser 16 are heat exchangers and form the thermal interconnections between the drying air stream circuit 10 and the refrigerant circuit 20.

In the drying air stream circuit 10, the evaporator 14 cools down and dehumidifies the drying air stream, after the warm and humid air stream has passed the laundry drum 12. Then, the condenser 16 heats up the drying air stream, before the drying air stream is re-inserted into the laundry drum 12 again. The drying air stream is driven by the drying air stream fan 18 arranged between the condenser 16 and the laundry drum 12. In the refrigerant circuit 20, a refrigerant is compressed and heated up by the compressor 22, cooled down and condensed in the condenser 16, expanded in the expansion device 24, then vaporised and heated up in the evaporator 14.

The drying air stream fan 18 is driven by a fan motor 26. The laundry drum 12 is driven by a drum motor 28. The fan motor 26 and the drum motor 28 are controlled by a control unit 30. The fan motor 26 is connected to the control unit 30 by a fan control line 32. The drum motor 28 is connected to the control unit 30 by a drum control line 34. Preferably, the fan motor 26 and the drum motor 28 are inverter motors.

The speed of the fan motor 26 and the speed vd of the drum motor 28 are independent from each other. The drum motor 28 is controlled at a predetermined speed course vd having a specific speed profile or pattern over time, which profile or pattern can depend on the selections made by the user. The specific speed profile or pattern over time can include a constant speed over time or a pre-fixed average speed over time, in the latter case the speed vd of the drum motor 28 oscillates around said average speed or generally the specific speed profile or pattern over time can include a speed varying over time according to the drying cycle selected by the user.

The power Pd absorbed by the drum motor 28 depends on the amount of load inside the laundry drum 12. The higher the amount of load in the laundry drum 12, the higher the power consumption of the drum motor 28. Thus, the amount of load inside the laundry drum 12 may be detected by the measuring the power Pd of the drum motor 28 controlled at a predetermined speed course vd. For instance, if the drum motor 28 is controlled at a speed vd of 2700 rpm, then the power Pd absorbed by the drum motor 28 during the first minutes after the start is about 220 W in the case of a maximum amount of load and about 200 W in the case of a half load in the laundry drum 12.

The drum motor 28 is connected to the laundry drum 12 by means of a pulley-belt system so that the laundry drum can rotate at a speed of 20-70 rpm.

Preferably, the drying air steam fan 18 is directly fixed on the shaft of the fan motor 26.

On the basis of the power Pd absorbed by the drum motor 28 during the first minutes after the start, the speed vf of the fan motor 26 can be set. Preferably, the fan motor 26 starts at a speed vf provided for the maximum amount of load. Then, the speed vf of the fan motor 26 increases, if only a partial load is recognized. For example, the fan motor 26 starts at a speed vf of 2700 rpm. If the partial load is recognized, then the speed vf of the fan motor 26 increases to a higher speed vf.

The following table shows an example of the correlation between the power Pd of the drum motor 28 and the speed vf of the fan motor 26.

| Pd (W) | vf (rpm) |
|---|---|
| >200 | 2700 |
| 200 to 180 | 2900 |
| <180 | 3100 |

The speed vf of the fan motor 26 of 2700 rpm corresponds with the maximum amount of load inside the laundry drum 12. If only a partial load (e.g. half load) is recognized, then the speed vf of about 2900 rpm is set or if a load lower than the partial load is recognized, then the speed vf of about 3100 rpm is adjusted. In the table above the speed vf of the fan motor 26 depends on the power Pd absorbed by the drum motor 28.

When the speed vf of the fan motor 26 increases, then the generated higher flow rate of the drying air stream improves the drying efficiency in terms of reducing the drying time.

In the case of a heat pump laundry dryer, the higher flow rate improves the heat exchange at the evaporator 14 and condenser 16 of the heat pump system. Thereby the efficiency of the heat pump system is also improved. The improved heat exchange at the evaporator 14 and condenser 16 of the heat pump system leads to a decrease of the pressure difference between the pressure value of the refrigerant in the high pressure portion of the refrigerant circuit and the pressure value of the refrigerant in the low pressure portion of the refrigerant, which reduces the work of the compressor 22 and the energy consumption.

The compressor 22 of the heat pump system may be provided with a variable compressor speed. Said compressor speed is set according to the speed of the fan-drum motor 26.

For the safety of the fan motor 26 and for a noise limit level, a maximum speed level may be defined for the fan motor 26.

Figure 2:
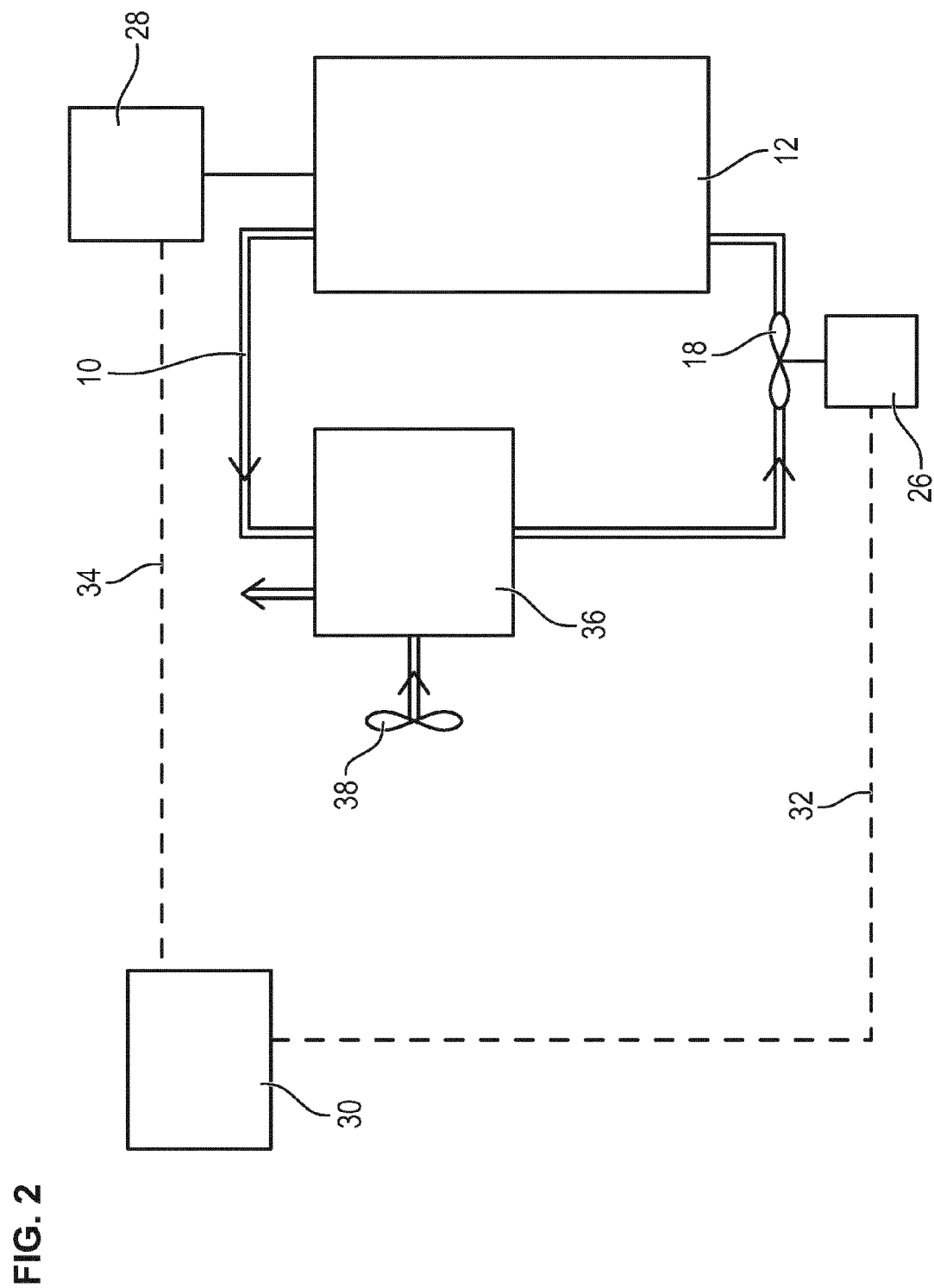
FIG. 2 illustrates a schematic diagram of the laundry dryer with an air-to-air condenser according to a second embodiment of the present invention.

FIG. 2 illustrates a schematic diagram of the laundry dryer with an air-to-air condenser 36 according to a second embodiment of the present invention.

The laundry dryer comprises the closed air stream circuit 10. The drying air stream circuit 10 of the second embodiment is formed by the laundry drum 12, the air-to-air condenser 36 and the drying air stream fan 18. The air-to-air condenser 36 corresponds with an ambient air fan 38. The air-to-air condenser 36 is an air-to-air heat exchanger and forms the thermal interconnection between the drying air stream circuit 10 and the ambient air. The air-to-air condenser 36 includes two separate channels. The first channel is provided for the drying air stream of the drying air stream circuit 10. The second channel is provided for the ambient air. The ambient air is blown through the second channel by the ambient air fan 38.

The air-to-air condenser 36 cools down and dehumidifies the drying air stream by ambient air, after the warm and humid air stream has passed the laundry drum 12. Then, the drying air stream is heated up by the heating device, for example by an electric heating element, before the drying air stream is re-inserted into the laundry drum 12 again. Said heating device is not shown. The drying air stream is driven by the drying air stream fan 18 arranged, in the example shown, between the air-to air condenser 36 and the laundry drum 12.

The drying air stream fan 18 is driven by the fan motor 26. The laundry drum 12 is driven by the drum motor 28. The fan motor 26 and the drum motor 28 are controlled by the control unit 30. The fan motor 26 is connected to the control unit 30 by the fan control line 32. In a similar way, the drum motor 28 is connected to the control unit 30 by the drum control line 34. Preferably, the fan motor 26 and the drum motor 28 are inverter motors.

The speed of the fan motor 26 depends on the power Pd absorbed by the drum motor 28 in the same way as in the first embodiment according to FIG. 1.

For the safety of the fan motor 26 and for the noise limit level, a maximum speed level may be defined for the fan motor 26.

Figure 3:
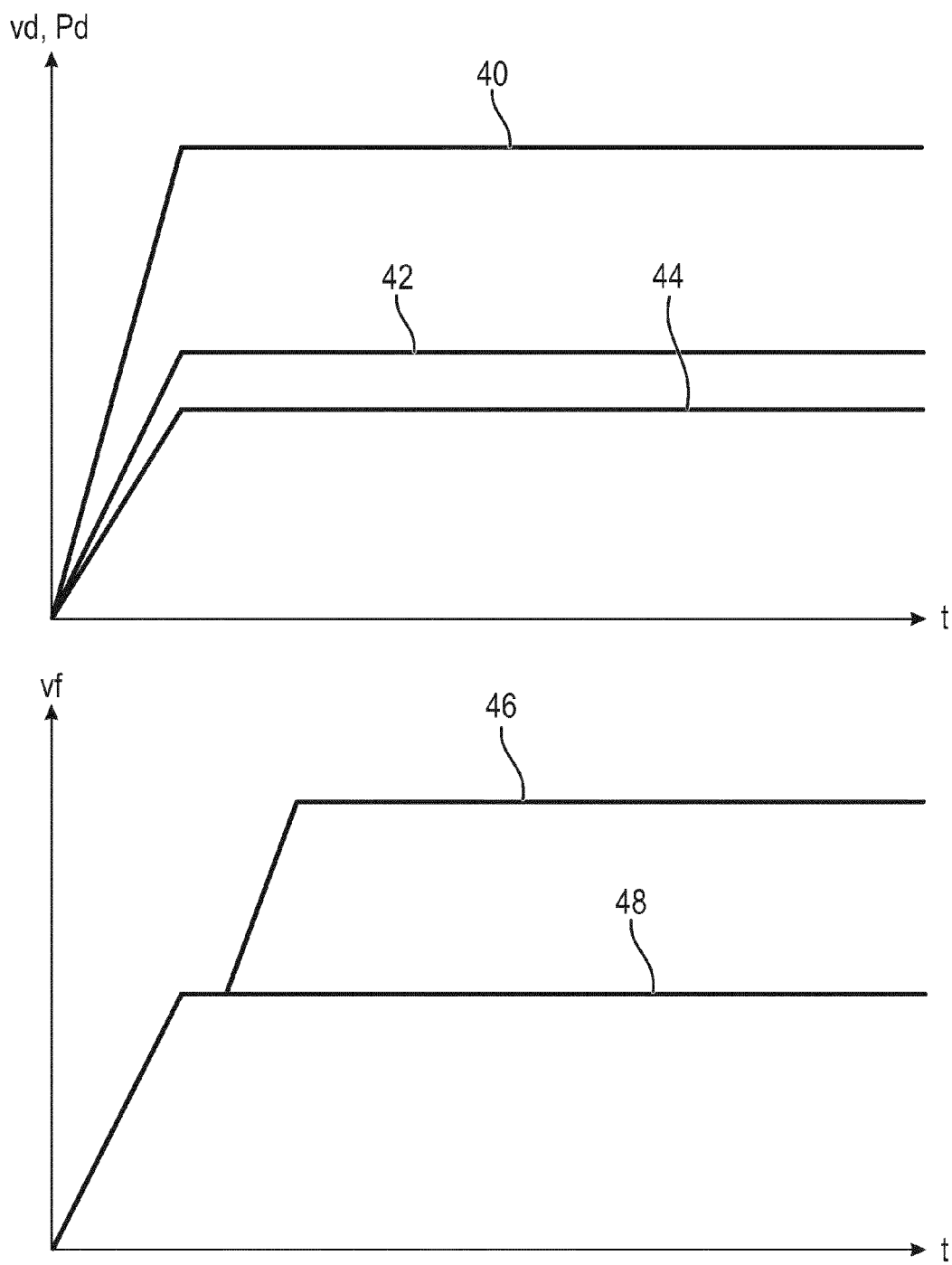
FIG. 3 illustrates schematic diagrams of the speed and power of the drum motor of a first example and the speed of the fan motor as functions of the time according to the present invention.
Figure 4:
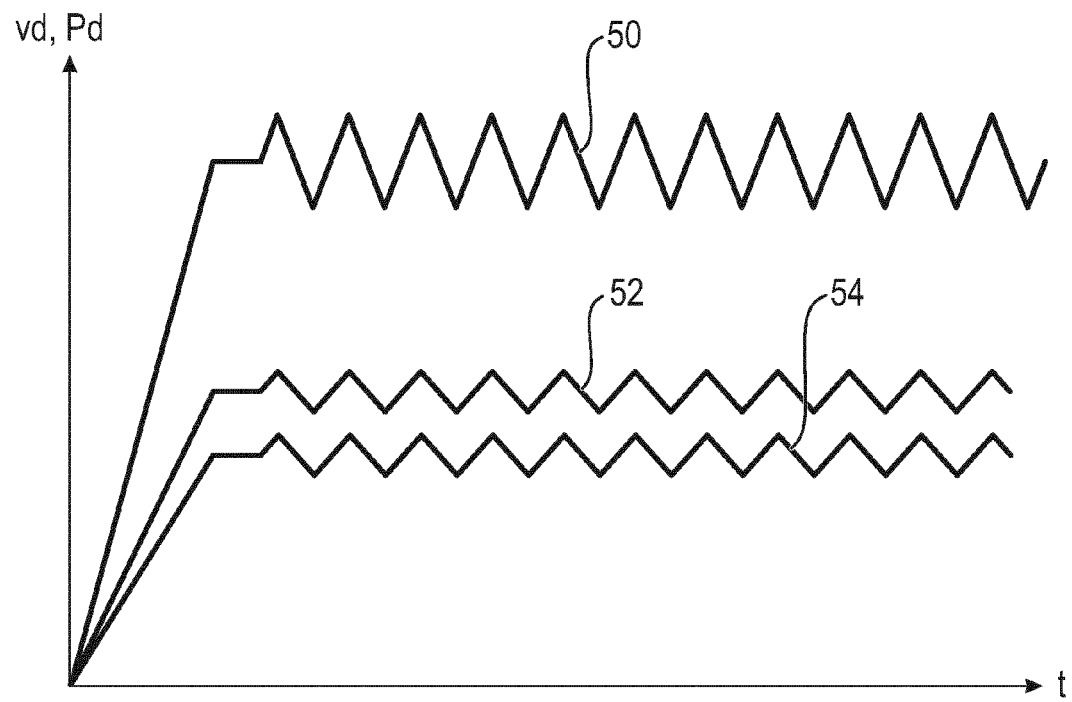
FIG. 4 illustrates schematic diagrams of the speed and power of the drum motor of a second example and the speed of the fan motor as functions of the time according to the present invention.
Figure 4:
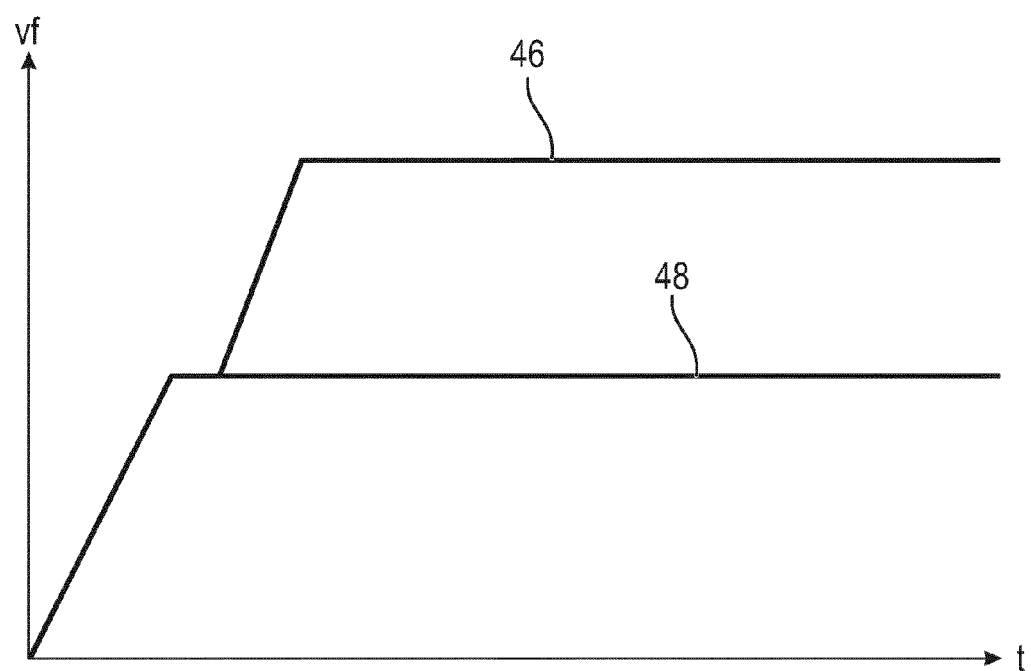

The following diagrams in FIG. 3 and FIG. 4 show examples of the speed vf of the fan motor 26 and the speed vd and power Pd of the drum motor 28 as functions of the time t.

FIG. 3 illustrates schematic diagrams of the speed vd and power Pd of the drum motor 28 of a first example and the speed vf of the fan motor 26 as functions of the time t according to the present invention.

The diagram 40 represents a predetermined speed course vd of the drum motor 28. The diagram 42 represents the power Pd of the drum motor 28 in the case of a high amount of load inside the laundry drum 12. The diagram 44 represents the power Pd of the drum motor 28 in the case of a low amount of load inside the laundry drum 12. The diagram 46 represents the speed vf of the fan motor 26 in the case of a low power Pd absorbed by the drum motor 28. The speed vf of the fan motor 26 according to diagram 46 corresponds with the power Pd of the drum motor 28 according to diagram 44. The diagram 48 represents the speed vf of the fan motor 26 in the case of a high power Pd absorbed by the drum motor 28. The speed vf of the fan motor 26 according to diagram 48 corresponds with the power Pd of the drum motor 28 according to diagram 42.

The drum motor 28 is driven at the predetermined speed course vd according to diagram 40. In the case of the high amount of load inside the laundry drum 12, the drum motor 28 absorbs a power Pd according to diagram 42. In the case of the low amount of load inside the laundry drum 12, the drum motor 28 absorbs a power Pd according to diagram 44. The absorbed power Pd in the case of the low amount of load is lower than in the case of the high amount of load.

The speed vf of the fan motor 26 in the case of the low absorbed power Pd according to diagram 46 is higher than the speed vf of the fan motor 26 in the case of the high absorbed power Pd according to diagram 48.

FIG. 4 illustrates schematic diagrams of the speed vd and power Pd of the drum motor 28 of a second example and the speed vf of the fan motor 26 as functions of the time t according to the present invention.

The diagram 50 represents a further predetermined speed course vd of the drum motor 28. The diagram 52 represents the power Pd of the drum motor 28 in the case of the high amount of load inside the laundry drum 12. The diagram 54 represents the power Pd of the drum motor 28 in the case of the low amount of load inside the laundry drum 12. The diagram 46 represents the speed vf of the fan motor 26 in the case of the low power Pd absorbed by the drum motor 28. The diagram 48 represents the speed vf of the fan motor 26 in the case of the high power Pd absorbed by the drum motor 28.

The diagrams 50, 52 and 54 differs from the diagrams 40, 42 and 44 in that the speed vd and power Pd of the drum motor 28 are periodic functions and oscillate around average values. The oscillating speed vd of the drum motor 28 is set according, for example, a selection made by the user. The periodic and oscillating power Pd absorbed by the drum motor 28 is a consequence of the periodic and oscillating speed vd of the drum motor 28. The average values of the oscillating diagrams 50, 52 and 54 correspond with the diagrams 40, 42 and 44 in FIG. 3.

Figure 5:
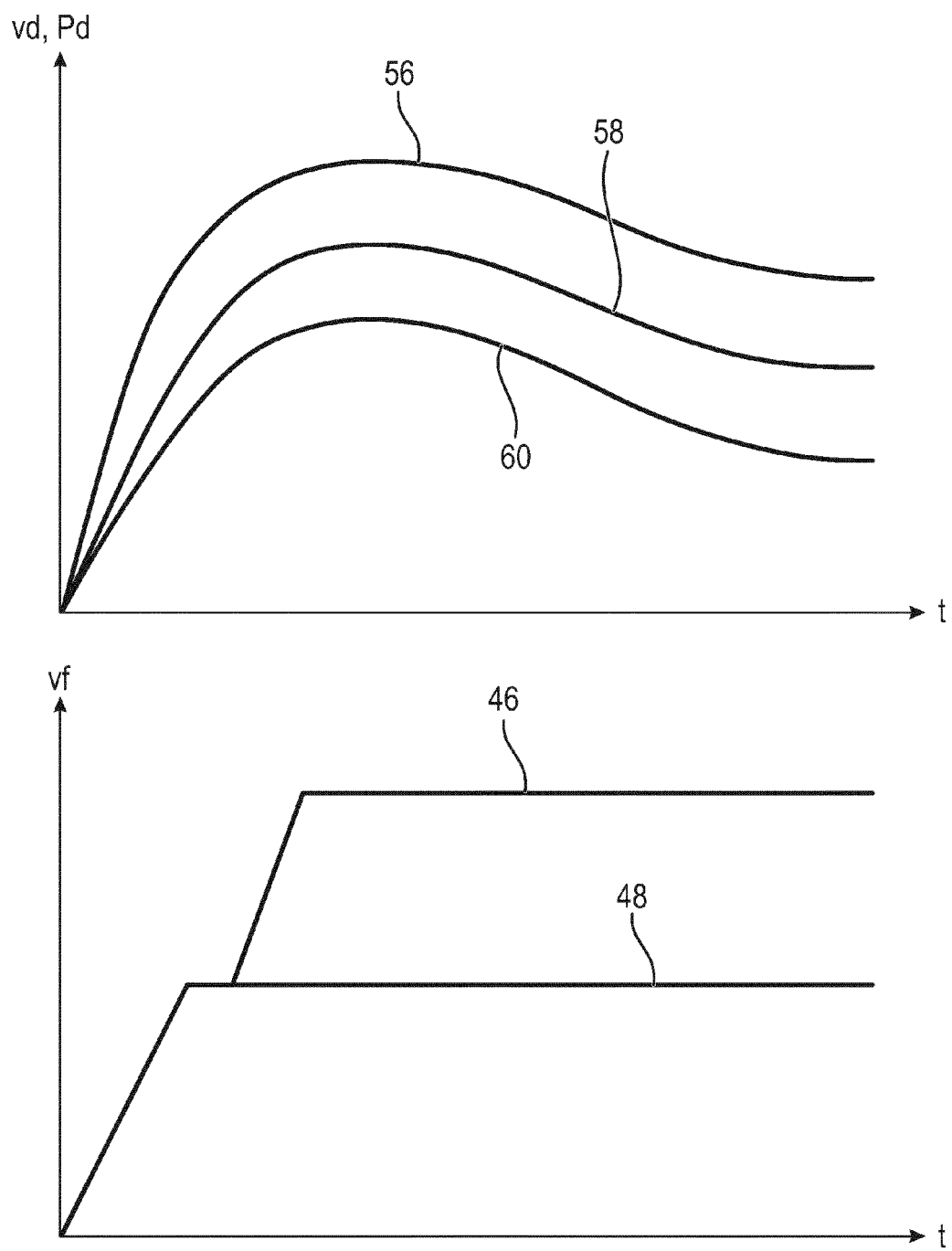
FIG. 5 illustrates schematic diagrams of the speed and power of the drum motor of a third example and the speed of the fan motor as functions of the time according to the present invention.

FIG. 5 illustrates schematic diagrams of the speed vd and power Pd of the drum motor 28 of a third example and the speed vf of the fan motor 26 as functions of the time t according to the present invention.

The diagram 56 represents a further predetermined speed course vd of the drum motor 28. The diagram 58 represents the power Pd of the drum motor 28 in the case of a high amount of load inside the laundry drum 12. The diagram 60 represents the power Pd of the drum motor 28 in the case of a low amount of load inside the laundry drum 12. The diagram 46 represents the speed vf of the fan motor 26 in the case of a low power Pd absorbed by the drum motor 28. The speed vf of the fan motor 26 according to diagram 46 corresponds with the power Pd of the drum motor 28 according to diagram 60. The diagram 48 represents the speed vf of the fan motor 26 in the case of a high power Pd absorbed by the drum motor 28. The speed vf of the fan motor 26 according to diagram 48 corresponds with the power Pd of the drum motor 28 according to diagram 58.

The predetermined speed course vd of the drum motor 28 according to diagram 56 in FIG. 5 generate drum movements to treat, for example, specific textile or for providing an anti-wrinkling function.

According to an alternative method, the drum motor 28 is controlled at a predetermined power course Pd and the speed of the drum motor, which varies depending on the amount of load inside the laundry drum 12, is detected. The speed of the fan motor is controlled in response to the detected speed of the drum motor 28.

The following table shows an example of the correlation between the speed vd of the drum motor 28 and the speed vf of the fan motor 26 according to the alternative method. It is to be noted that in the table and example below the laundry drum 12 rotational speed has been detected instead of the speed of drum motor 28, since the two speed are inevitably linked. Particularly, a drum speed lower that 60 rpm indicates a substantially maximum amount of load inside the laundry drum 12, a drum speed in a range of 60 to 65 may indicates a half load and a drum speed of greater than 65 may indicate a partial load

| vd (rpm) | vf (rpm) |
|---|---|
| <60 | 2700 |
| 60 to 65 | 2900 |
| >65 | 3100 |

The speed vf of the fan motor 26 of 2700 rpm corresponds with the maximum amount of load inside the laundry drum 12. If only a partial load (e.g. half load) is recognized, then the speed vf of about 2900 rpm is set or if a load lower than the partial load is recognized, then the speed vf of about 3100 rpm is adjusted In the table above the speed vf of the fan motor 26 depends on the speed vd of the drum motor 28 which drives the laundry drum 12, or correspondently the speed vf of the fan motor 26 depends on the speed vd of the laundry drum 12.

Figure 6:
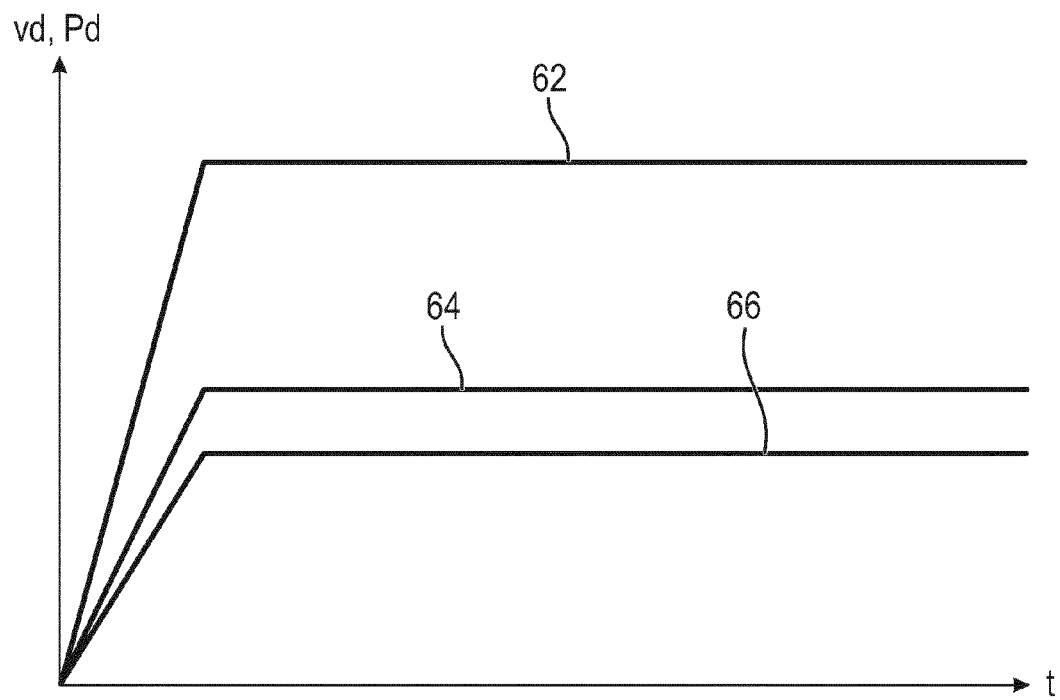
FIG. 6 illustrates schematic diagrams of the speed and power of the drum motor of a fourth example and the speed of the fan motor as functions of the time according to the present invention.
Figure 6:
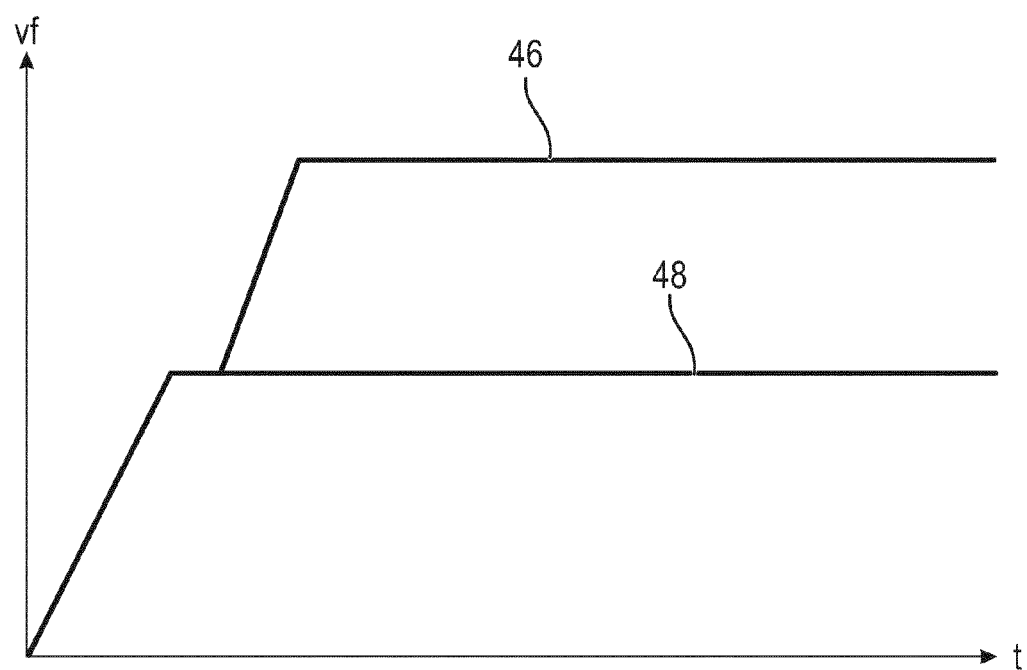

FIG. 6 illustrates schematic diagrams of the speed vd and power Pd of the drum motor 28 of a fourth example and the speed vf of the fan motor 26 as functions of the time t according to the present invention.

The diagram 62 represents a predetermined power course Pd of the drum motor 28. The diagram 64 represents the speed vd of the drum motor 28 in the case of low amount of load inside the laundry drum 12. The diagram 66 represents the speed vd of the drum motor 28 in the case of high amount of load inside the laundry drum 12. The diagram 46 represents the speed vf of the fan motor 26 in the case of a low power Pd absorbed by the drum motor 28. The speed vf of the fan motor 26 according to diagram 46 corresponds with the speed vd of the drum motor 28 according to diagram 64. The diagram 48 represents the speed vf of the fan motor 26 in the case of a high power Pd absorbed by the drum motor 28. The speed vf of the fan motor 26 according to diagram 48 corresponds with the speed vd of the drum motor 28 according to diagram 66.

Figure 7:
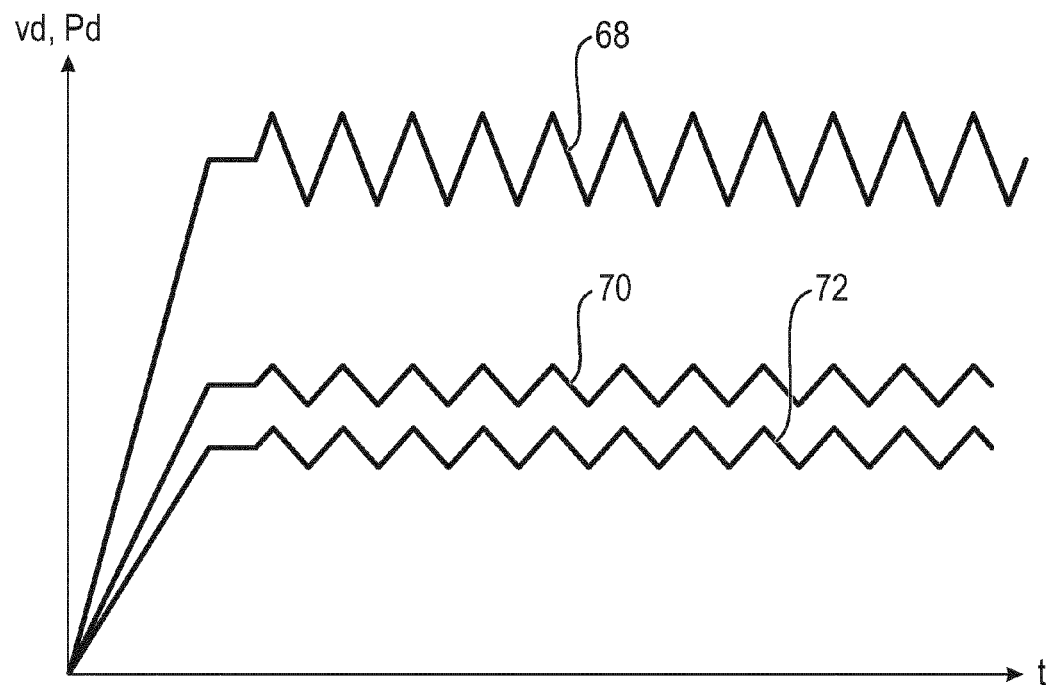
FIG. 7 illustrates schematic diagrams of the speed and power of the drum motor of a fifth example and the speed of the fan motor as functions of the time according to the present invention.
Figure 7:
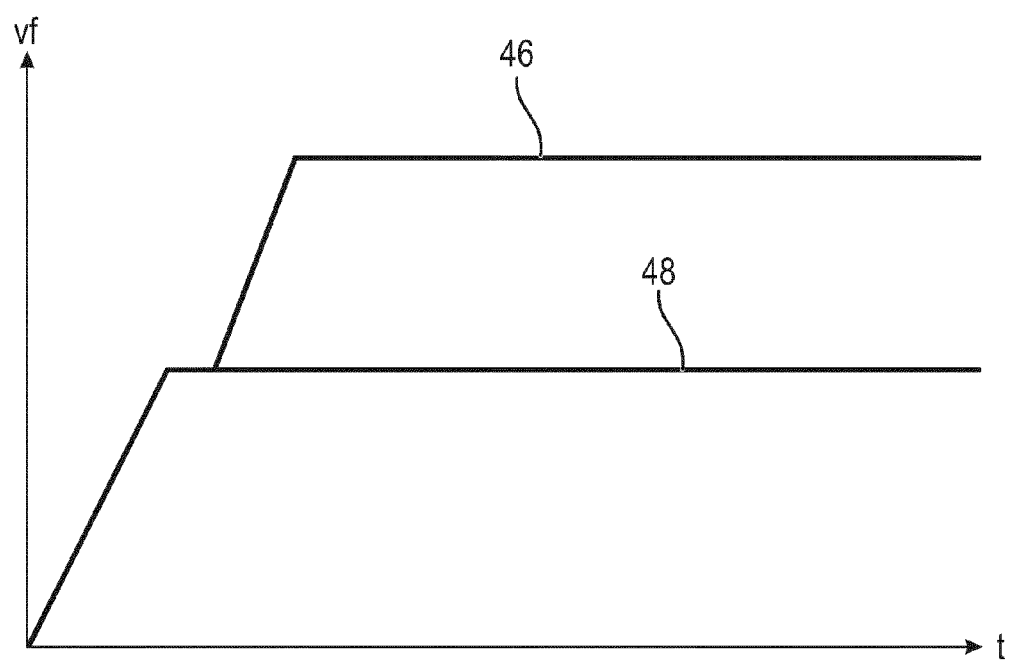

FIG. 7 illustrates schematic diagrams of the speed vd and power Pd of the drum motor 28 of a fifth example and the speed vf of the fan motor 26 as functions of the time t according to the present invention.

The diagram 68 represents a further predetermined power course Pd of the drum motor 28. The diagram 70 represents the speed vd of the drum motor 28 in the case of low amount of load inside the laundry drum 12. The diagram 72 represents the speed vd of the drum motor 28 in the case of the high amount of load inside the laundry drum 12. The diagram 46 represents the speed vf of the fan motor 26 in the case of the low power Pd absorbed by the drum motor 28. The diagram 48 represents the speed vf of the fan motor 26 in the case of the high power Pd absorbed by the drum motor 28.

The diagrams 68, 70 and 72 differs from the diagrams 62, 64 and 66 in that the speed vd and power Pd of the drum motor 28 are periodic functions and oscillate around average values. The course of the power Pd of the drum motor 28 is set. The periodic and oscillating speed vd of the drum motor 28 is a consequence of the periodic and oscillating power Pd absorbed by the drum motor 28. The average values of the oscillating diagrams 68, 70 and 72 correspond with the diagrams 62, 64 and 66 in FIG. 6.

Figure 8:
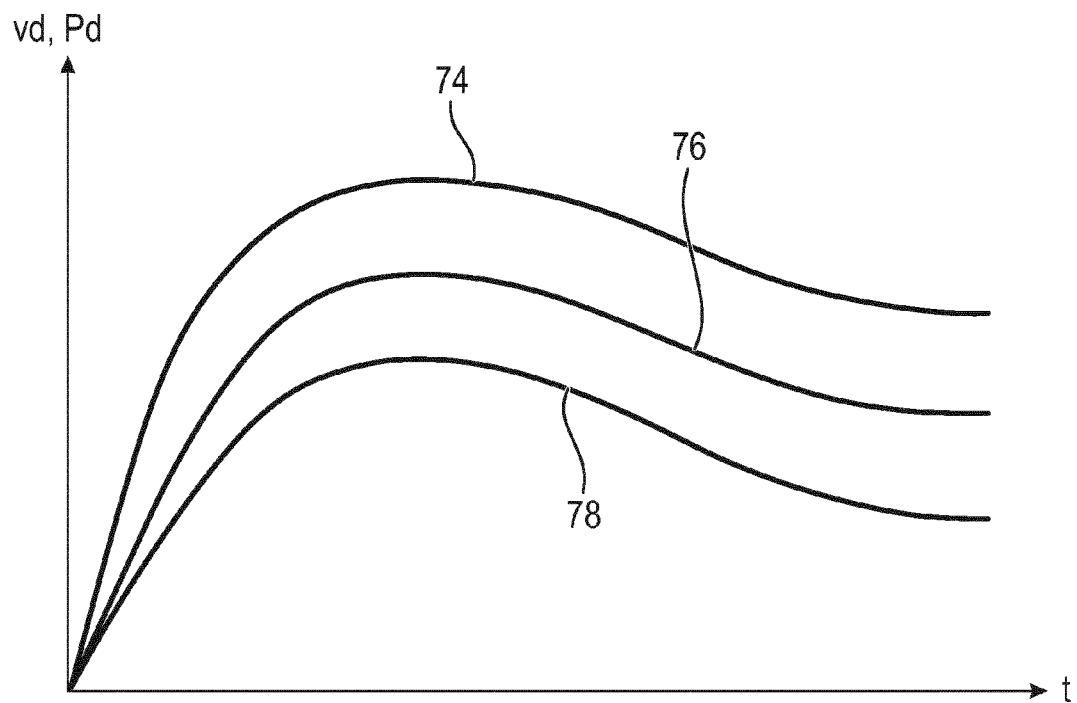
FIG. 8 illustrates schematic diagrams of the speed and power of the drum motor of a sixth example and the speed of the fan motor as functions of the time according to the present invention.
Figure 8:
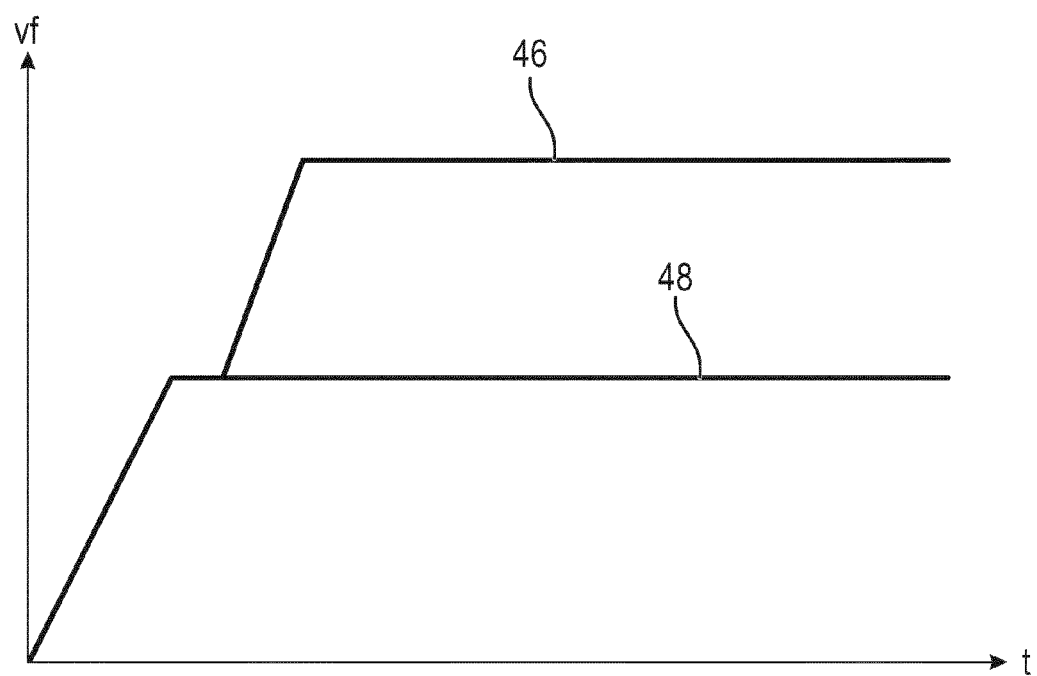

FIG. 8 illustrates schematic diagrams of the speed vd and power Pd of the drum motor 28 of a sixth example and the speed vf of the fan motor 26 as functions of the time t according to the present invention.

The diagram 74 represents a further predetermined power course Pd of the drum motor 28. The diagram 76 represents the speed vd of the drum motor 28 in the case of low amount of load inside the laundry drum 12. The diagram 78 represents the speed vd of the drum motor 28 in the case of high amount of load inside the laundry drum 12. The diagram 46 represents the speed vf of the fan motor 26 in the case of a low power Pd absorbed by the drum motor 28. The speed vf of the fan motor 26 according to diagram 46 corresponds with the speed vd of the drum motor 28 according to diagram 76. The diagram 48 represents the speed vf of the fan motor 26 in the case of a high power Pd absorbed by the drum motor 28. The speed vf of the fan motor 26 according to diagram 48 corresponds with the speed vd of the drum motor 28 according to diagram 78.

During the drying cycle, the weight of the laundry inside the laundry drum 12 tends to decrease due to the evaporation of the laundry moisture. Thus, the power Pd of the drum motor 28 according to diagrams 42 and 44 tends to decrease slightly, since less power Pd is required to maintain the same speed vd. In a similar way, the average value of the power Pd of the drum motor 28 according to diagrams 52 and 54 tends to decrease slightly.

According to the present invention the speed vf of the fan motor 26 is adapted to the amount of load inside the laundry drum 12. In the case of a partial load inside the laundry drum 12, the speed vf of the fan motor 26 is higher than in the case of the maximum amount of load. The flow rate of an air stream for the partial load is higher than the flow rate of the drying air stream for the maximum amount of load. The higher rotation speed of the drying air stream fan 18 reduces the drying time.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

10 drying air stream circuit
12 laundry drum
14 evaporator
16 condenser
18 drying air stream fan
20 refrigerant circuit
22 compressor
24 expansion device
26 fan motor
28 drum motor
30 control unit
32 fan control line
34 drum control line
36 air-to-air condenser
38 ambient air fan
40 diagram of the speed vd
42 diagram of the power Pd at high amount of load
44 diagram of the power Pd at low amount of load
46 diagram of the speed vf at low amount of load
48 diagram of the speed vf at high amount of load
50 diagram of the speed vd
52 diagram of the power Pd at high amount of load
54 diagram of the power Pd at low amount of load
56 diagram of the power Pd at high amount of load
58 diagram of the power Pd at low amount of load
60 diagram of the speed vf at low amount of load
62 diagram of the power Pd
64 diagram of the speed vd at low amount of load
66 diagram of the speed vf at high amount of load
68 diagram of the power Pd
70 diagram of the speed vd at low amount of load
72 diagram of the speed vd at high amount of load
74 diagram of the power Pd
76 diagram of the speed vd at low amount of load
78 diagram of the speed vd at high amount of load
vf speed of the fan motor
vd speed of the drum motor
Pd power of the drum motor
t time

The invention claimed is:

1. A method for controlling a laundry dryer including a fan motor for driving a drying air stream fan with a variable speed (vf) and a drum motor for driving a laundry drum, said method comprising the steps of:
    setting a predetermined course for the speed (vd) of the drum motor,
    maintaining the speed (vd) of the drum motor according to the predetermined course for the speed (vd) of said drum motor,
    detecting a power (Pd) or a current absorbed by the drum motor, and
    controlling the speed (vf) of the fan motor on the basis of the absorbed power (Pd) or current of the drum motor, wherein
    the speed (vf) of the fan motor increases with a decreasing absorbed power (Pd) or current of the drum motor and/or
    the speed (vf) of the fan motor decreases with an increasing absorbed power (Pd) or current of the drum motor.

2. The method according to claim 1, wherein the steps of setting the predetermined course for the speed (vd) of the drum motor and of maintaining the speed (vd) of the drum motor according to the predetermined course for the speed (vd) of said drum motor comprise controlling an inverter motor according to a predetermined speed profile.

3. The method according to claim 1, wherein the speed (vf) of the fan motor starts with a predetermined speed value, and after starting the fan motor with said predetermined speed value, the speed (vf) of the fan motor is modified on the basis of the absorbed power (Pd) or current of the drum motor.

4. The method according to claim 1, wherein the step of controlling the speed (vf) of the fan motor on the basis of the absorbed power (Pd) or current of the drum motor occurs after a drying cycle starting phase including the step of detecting the power (Pd) or current absorbed by the drum motor, respectively.

5. The method according to claim 1, wherein the course for the speed (vd) of the drum motor is a periodic function, and said periodic function oscillates around an average value of the speed (vd).

6. The method according to claim 1, wherein the speed (vf) of the fan motor increases linearly with the decreasing absorbed power (Pd) or current of the drum motor, respectively, and/or the speed (vf) of the fan motor decreases linearly with the increasing absorbed power (Pd) or current of the drum motor, respectively.

7. The method according to claim 1, wherein a maximum level for the speed (vf) of the fan motor is defined, and said maximum level depends on the noise generated by the air steam fan and/or on the power absorbed by the fan motor and/or on the flow rate generated by the fan motor.

8. The method according to claim 1, wherein the method is provided for a laundry dryer with a heat pump system, and a rotation speed or power of a compressor of said heat pump system is controlled in dependence of the speed (vf) of the fan motor, and the rotation speed or power of the compressor increases with an increasing speed (vf) of the fan motor.

9. A laundry dryer including a drying air stream circuit with a laundry drum and a drying air stream fan, wherein:
the laundry dryer comprises a drum motor for driving the laundry drum,
the laundry dryer comprises a fan motor for driving the drying air stream fan,
the laundry dryer comprises a control unit for controlling the speed (vf) of the fan motor and the speed (vd) of the drum motor,
the control unit is configured to set a predetermined course for the speed (vd) or the power (Pd) of the drum motor,
the control unit is configured to maintain the speed (vd) or power (Pd), respectively, of the drum motor according to the predetermined course,
the control unit is configured to detect the power (Pd) or current absorbed by the drum motor or the speed (vd) of said drum motor,
the control unit is configured to control the speed (vf) of the fan motor on the basis of the power (Pd) or current absorbed by the drum motor or the speed (vd) of said drum motor, so that:
the speed (vf) of the fan motor increases with a decreasing power (Pd) or current absorbed by the drum motor or with an increasing speed (vd) of said drum motor, respectively, and/or
the speed (vf) of the fan motor decreases with an increasing power (Pd) or current absorbed by the drum motor or with a decreasing speed (vd) of said drum motor, respectively; and
wherein the laundry dryer is configured to carry out the method according to claim 1.

10. The laundry dryer according to claim 9, wherein the fan motor is an inverter motor.

11. The laundry dryer according to claim 9, wherein a heat pump system with a refrigerant compressor is provided.

12. The laundry dryer according to claim 11, wherein the control unit is adapted to adjust the rotation speed or power of said refrigerant compressor in dependence of the speed of the fan motor.

13. A laundry dryer including a drying air stream circuit with a laundry drum and a drying air stream fan, wherein:
the laundry dryer comprises a drum motor for driving the laundry drum,
the laundry dryer comprises a fan motor for driving the drying air stream fan,
the laundry dryer comprises a control unit for controlling the speed (vf) of the fan motor and the speed (vd) of the drum motor,
the control unit is configured to set a predetermined course for the speed (vd) or the power (Pd) of the drum motor,
the control unit is configured to maintain the speed (vd) or power (Pd), respectively, of the drum motor according to the predetermined course,
the control unit is configured to detect the power (Pd) or current absorbed by the drum motor or the speed (vd) of said drum motor,
the control unit is configured to control the speed (vf) of the fan motor on the basis of the power (Pd) or current absorbed by the drum motor or the speed (vd) of said drum motor, so that:
the speed (vf) of the fan motor increases with a decreasing power (Pd) or current absorbed by the drum motor or with an increasing speed (vd) of said drum motor, respectively, and/or
the speed (vf) of the fan motor decreases with an increasing power (Pd) or current absorbed by the drum motor or with a decreasing speed (vd) of said drum motor, respectively; and
wherein the laundry dryer is configured to carry out a method comprising the steps of:
setting a predetermined course for the power (Pd) of the drum motor,
maintaining the speed (vd) of the drum motor according to the predetermined course for the power (Pd) of said drum motor,
detecting a speed (vd) of the drum motor, and
controlling the speed (vf) of the fan motor on the basis of the speed (vd) of the drum motor, wherein
the speed (vf) of the fan motor increases with an increasing speed (vd) of the drum motor, and/or
the speed (vf) of the fan motor decreases with a decreasing speed (vd) of the drum motor.

* * * * *